(12) United States Patent
Li et al.

(10) Patent No.: US 9,791,664 B2
(45) Date of Patent: Oct. 17, 2017

(54) LARGE-FIELD-OF-VIEW ACHROMATIC LENS

(71) Applicants: HAN'S LASER TECHNOLOGY INDUSTRY GROUP CO., LTD., Shenzhen, Guangdong (CN); HAN'S CNC SCIENCE AND TECHNOLOGY CO., LTD, Shenzhen, Guangdong (CN)

(72) Inventors: Jiaying Li, Guangdong (CN); Chaoming Zhou, Guangdong (CN); Bo Sun, Guangdong (CN); Yunfeng Gao, Guangdong (CN)

(73) Assignees: HAN'S LASER TECHNOLOGY INDUSTRY GROUP CO., LTD., Shenzhen (CN); HAN'S CNC SCIENCE AND TECHNOLOGY CO., LTD., Shenzhen (CN)

( * ) Notice: Subject to any disclaimer, the term of this patent is extended or adjusted under 35 U.S.C. 154(b) by 58 days.

(21) Appl. No.: 14/913,237

(22) PCT Filed: Aug. 22, 2013

(86) PCT No.: PCT/CN2013/082062
§ 371 (c)(1),
(2) Date: Feb. 19, 2016

(87) PCT Pub. No.: WO2015/024231
PCT Pub. Date: Feb. 26, 2015

(65) Prior Publication Data
US 2016/0195692 A1 Jul. 7, 2016

(51) Int. Cl.
*G02B 9/62* (2006.01)
*G02B 3/02* (2006.01)
(Continued)

(52) U.S. Cl.
CPC ............ *G02B 9/62* (2013.01); *B23K 26/0648* (2013.01); *B23K 26/0665* (2013.01); *G02B 9/60* (2013.01); *G02B 13/14* (2013.01); *G02B 13/24* (2013.01)

(58) Field of Classification Search
CPC .......... G02B 13/00; G02B 9/62; G02B 13/04; G02B 9/60; G02B 13/16; G02B 9/34; G02B 21/02; G02B 13/18
(Continued)

(56) References Cited

U.S. PATENT DOCUMENTS 5,675,440 A 10/1997 Kanamori
6,850,350 B2 2/2005 Kawabata et al.

FOREIGN PATENT DOCUMENTS

CN 101038365 A 9/2007
CN 101893751 A 11/2010
(Continued)

OTHER PUBLICATIONS

Office Action dated Dec. 19, 2016 issued in corresponding Japanese Patent Application No. 2016-535294, pp. 1-5.
(Continued)

*Primary Examiner* — Dawayne A Pinkney
(74) *Attorney, Agent, or Firm* — Polsinelli PC

(57) ABSTRACT

A large filed achromatic lens is disclosed, including a first lens element, a second lens element, a third lens element, a fourth lens element, a fifth lens element, and a sixth lens element arranged sequentially along the propagation direction of an incident ray. The first lens element is a meniscus lens element including a first curved surface and a second curved surface; the second lens element is a meniscus lens element, including a third curved surface and a fourth curved surface; the third lens element is a biconvex lens element, including a fifth curved surface and a sixth curved surface;

(Continued)

the fourth lens element is a biconvex lens element, including a seventh curved surface and an eighth curved surface; the fifth lens element is a biconcave lens element including a ninth curved surface and a tenth curved surface; and the sixth lens element is a plane lens element adapted to play a role in protecting other lens elements. The first to the fifth lens elements are arranged around a same axis sequentially along the propagation direction of an incident ray. The first to the tenth curved surfaces are arranged sequentially along the propagation direction of the incident ray. The above large filed achromatic lens can be used as a fine photoetching lens for laser marking, or other fine processing lenses.

8 Claims, 3 Drawing Sheets

(51) Int. Cl.
G02B 13/04 (2006.01)
G02B 9/34 (2006.01)
G02B 13/14 (2006.01)
G02B 9/60 (2006.01)
G02B 13/24 (2006.01)
B23K 26/06 (2014.01)

(58) Field of Classification Search
USPC ....... 359/756, 757, 761, 759, 762–764, 767, 359/770, 658–659, 713–714, 752–753
See application file for complete search history.

(56) References Cited

FOREIGN PATENT DOCUMENTS

| | | |
|---|---|---|
| CN | 201740909 U | 2/2011 |
| JP | 7-230035 A | 8/1995 |
| JP | H07287163 A | 10/1995 |
| JP | 2007-47334 A | 2/2007 |
| JP | 2010-134405 A | 6/2010 |
| JP | 2012-93661 A | 5/2012 |

OTHER PUBLICATIONS

International Search Report, PCT/CN2013/082062.
Office Action dated Apr. 19, 2017 issued in corresponding Chinese Patent Application No. 201380078972.6

LARGE-FIELD-OF-VIEW ACHROMATIC LENS

CROSS REFERENCE TO RELATED APPLICATIONS

This application is a national stage application (under 35 U.S.C. §371) of PCT/CN2013/082062, filed Aug. 22, 2013, the contents of which are incorporated herein by reference in its entirety.

FIELD

The present invention relates to the field of optical lens, and more particularly, to a large filed achromatic lens.

BACKGROUND

As a processing technology, the laser processing enables cutting, welding, surface treatment, punching, micromachining and other processes of a material with the character of the interaction between the laser ray and the material.

As the application area laser processing expands rapidly, the demand of laser processing device is increasing, and the requirement of the quality of marking is also increasing. The width of the marking is generally required to be about 0.01 mm in the past, but nowadays the width is required to be about micrometers. This requires not only a laser processing device with a high precision, but also an optical system with a high imaging quality.

As an optical system of the laser processing device, the focusing lens plays a substantial role in the quality of the laser processing. However, the traditional focusing lens has a small field of view, with a lower imaging quality, which is difficult to satisfy the requirement of the width of the high-precision marking processed by laser.

SUMMARY

Based on above, there is a need to provide a large filed achromatic lens, with a larger field of view and a higher imaging quality.

A large filed achromatic lens, including:

a first lens element, which is a meniscus lens element, including a first curved surface and a second curved surface both protruding outward to an image side;

a second lens element, which is a meniscus lens element, including a third curved surface and a fourth curved surface both protruding outward to an image side;

a third lens element, which is a biconvex lens element, including a fifth curved surface protruding outward to an object side, and a sixth curved surface protruding outward to the image side;

a fourth lens element, which is a biconvex lens element, including a seventh curved surface protruding outward to the object side, and an eighth curved surface protruding outward to the image side;

a fifth lens element, which is a biconcave lens element, including a ninth curved surface protruding outward to the image side, and a tenth curved surface protruding outward to the object side;

wherein the first to the fifth lens elements are arranged sequentially around a same axis along the propagation direction of an incident ray, and the first to the tenth curved surfaces are arranged sequentially along the propagation direction of the incident ray;

wherein center thicknesses of the first to the fifth lens elements are 3 mm, 3 mm, 3 mm, 3 mm and 2 mm respectively, with an allowable tolerance of 10%, an upper variation of tolerance of +5%, and lower variation of tolerance of −5%; and wherein radiuses of curvature of the first to the tenth curved surfaces are −8 mm, −15 mm, −29 mm, −10 mm, 19 mm, −32 mm, 13 mm, −70 mm, −31 mm and 15 mm respectively, with an allowable tolerance of 10%, an upper variation of tolerance of +5%, and lower variation of tolerance of −5%.

In one embodiment, center-to-center distances between the second curved surface and the third curved surface, between the fourth curved surface and the fifth curved surface, between the sixth curved surface and the seventh curved surface, and between the eighth curved surface and the ninth curved surface are 0.1 mm, 0.1 mm, 0.1 mm and 1 mm respectively, with an allowable tolerance of 10%, an upper variation of tolerance of +5%, and lower variation of tolerance of −5%.

In one embodiment, the first to the fifth lens elements are rotationally symmetrical around the axis of the incident ray.

In one embodiment, each of the first to the tenth curved surfaces is a spherical surface.

In one embodiment, the large filed achromatic lens further includes a sixth lens element, which is a plane lens element arranged on a side of the fifth lens element adjacent to an image, including an eleventh curved surface and a twelfth curved surface both of which are flat planes.

In one embodiment, the sixth lens has a thickness of 1 mm, with an allowable tolerance of 10%, an upper variation of tolerance of +5%, and lower variation of tolerance of −5%.

In one embodiment, the eleventh curved surface is adjacent to the tenth curved surface, and a center-to-center distance between the eleventh curved surface and the tenth curved surface is 1 mm, with an allowable tolerance of 10%, an upper variation of tolerance of +5%, and lower variation of tolerance of −5%.

In one embodiment, the large filed achromatic lens meets the following requirements: f=20 mm, D/f=0.5, 2H=0.8 mm, $L_K$=15.7 mm, and λ=355 nm-532 nm, wherein f represents a focal length of a lens, D represents a diameter of an entrance pupil, D/f represents a relative aperture, 2H represents a width of a linear field of view, $L_K$ represents a working distance, and λ represents an operating wavelength.

The above large filed achromatic lens can be used as a fine photoetching lens for laser marking, or other fine processing lenses. Due to the lens combination of different types of lens element arranged around a same axis in combination with the optical design, the large filed achromatic lens does not only has a larger field of view, but also ensure the laser ray (with a wave length of about 355 nm) at work focus on a same plane when a visible monitoring ray (with a wave length of about 523 nm) is used preview and focus the surface of the processing work piece. In addition, the large filed achromatic lens has a higher achromatization function and a higher resolution to exposure fine lines to greatly improve the imaging quality. In conclusion, the large filed achromatic lens can achieve the quick alignment and positioning of the laser processing spot on the surface of the processing work piece, to greatly improve the processing efficiency and quality.

DETAILED DESCRIPTION OF THE PREFERRED EMBODIMENTS

These and other features of the large filed achromatic lens according to the present invention will be apparent from reading the following description provided by way of non-limiting example, with reference to the figures illustrated in the attached drawings. The drawings provide preferred embodiments of the present invention. Various implements of the present invention may, however, be embodied in many different forms and should not be construed as limited to the embodiments set forth herein. Rather, these embodiments are provided to enable better and comprehensive understanding of the invention of the present invention.

It's important to note that the negative sign used herein means the ray propagates from left to right. Taking the intersection point of the spherical surface and the principal optical axis as a reference point, if the center of the spherical surface is in the left of the intersection point, the radius of curvature has a negative value, if, on the other hand, the center of the spherical surface is in the right of the intersection point, the radius of curvature has a positive value. In addition, in view of the ray propagating from left to right, one side on the left of the lens is referred as the object side, and the other side on the right of the lens is referred as the image side.

Unless otherwise specified, all terminologies and scientific terms used herein have the same meaning as normal sense understood by a technical person belonging to the technical field of the present invention. The terms used herein is for the purpose of describing particular embodiments only and is not intended to be limiting of the present invention. As used herein, the term "and/or" includes any and all combinations of one or more of the associated listed items and may be abbreviated as "/".

Figure 1:
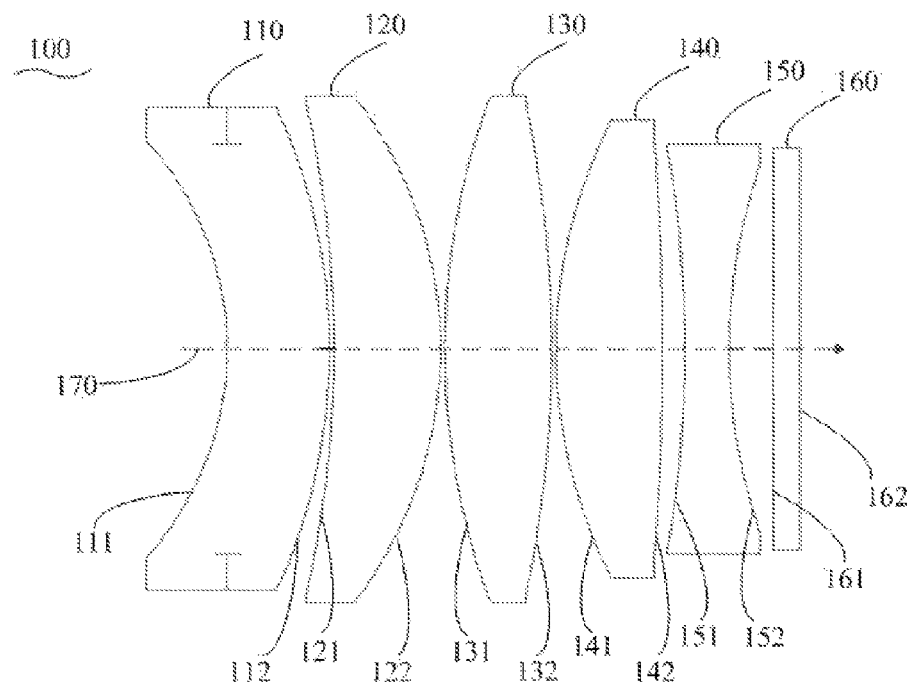
FIG. 1 is a structural schematic diagram of a large filed achromatic lens according to an embodiment of the present invention.

As shown in FIG. 1, in the embodiment, the large filed achromatic lens 100 includes six lens elements arranged sequentially along the propagation direction of an incident ray 170, including a first lens element 110, a second lens element 120, a third lens element 130, a fourth lens element 140, a fifth lens element 150 and a sixth lens element. The first to sixth lens elements 110, 120, 130, 140, 150, 160 are arranged around a same axis along the propagation direction of the incident ray 170.

The first lens element 110 is a meniscus lens element, including a first curved surface 111 and a second curved surface 112. Both of the first curved surface 111 and the second curved surface 112 are spherical surfaces, and protrude outward to the image side. The first curved surface 111 has a radius of curvature of −8±5% mm. The second curved surface 112 has a radius of curvature of −15±5% mm. The first lens element has a thickness of 3±5% mm along the optical axis.

The second lens element 120 is a meniscus lens element, including a third curved surface 121 and a four curved surface 122. Both of the third curved surface 121 and the fourth curved surface 122 are spherical surfaces, and protrude outward to the image side. The third curved surface 121 has a radius of curvature of −29±5% mm. The fourth curved surface 122 has a radius of curvature of −10±5% mm. The second lens element 120 has a thickness of 3±5% mm along the optical axis. The distance between the second lens element 120 and the first lens element 110, that is, the distance between the third curved surface 121 and the second curved surface 112 in the optical axis is preferably 0.1±5% mm.

The third lens element 130 is a biconvex lens element, including a fifth curved surface 131 and a sixth curved surface 132. The fifth curved surface 131 is a spherical surface protruding outward to the object side. The sixth curved surface 132 is a spherical surface protruding outward to the image side. The fifth curved surface 131 has a radius of curvature of 19±5% mm. The sixth curved surface 132 has a radius of curvature of −32±5% mm. The third lens element 130 has a thickness of 3±5% mm along the optical axis. The distance between the third lens element 130 and the second lens element 120, that is, the distance between the fifth curved surface 131 and the fourth curved surface 122 in the optical axis is preferably 0.1±5% mm.

The fourth lens element 140 is a biconvex lens element, including a seventh curved surface 141 and an eighth curved surface 142. The seventh curved surface 141 is a spherical surface protruding outward to the object side. The eighth curved surface 142 is a spherical surface protruding outward to the image side. The seventh curved surface 141 has a radius of curvature of 13±5% mm. The eighth curved surface 142 has a radius of curvature of −70±5% mm. The fourth lens element 140 has a thickness of 3±5% mm along the optical axis. The distance between the fourth lens element 140 and the third lens element 130, that is, the distance between the seventh curved surface 141 and the sixth curved surface 132 in the optical axis is preferably 0.1±5% mm.

The fifth lens element 150 is a biconcave lens element, including a ninth curved surface 151 and a tenth curved surface 152. The ninth curved surface 151 is a spherical surface protruding outward to the image side. The tenth curved surface 152 is a spherical surface protruding outward to the object side. The ninth curved surface 151 has a radius of curvature of −31±5% mm. The tenth curved surface 152 has a radius of curvature of 15±5% mm. The fifth lens element 150 has a thickness of 2±5% mm along the optical axis. The distance between the fifth lens element 150 and the fourth lens element 140, that is, the distance between the ninth curved surface 151 and the eighth curved surface 142 in the optical axis is preferably 1±5% mm.

The first to the tenth curved surfaces 111, 112, 121, 122, 131, 132, 141, 142, 151, 152 are arranged sequentially along the propagation direction of the incident ray 170.

The sixth lens element 160 is a plane lens element, including an eleventh curved surface 161 and a twelfth curved surface 162. Both of the eleventh curved surface 161 and the twelfth curved surface 162 are flat planes. The sixth lens element 160 is arranged on a side of the fifth lens element 150 adjacent to the image, adapted to play a role of protecting other lens elements. In other embodiments, the sixth lens element 160 may be arranged on a side of the first lens element 110 adjacent to the object, or arranged between two lens elements. The sixth lens element 160 has a thickness of 1±5% mm. The distance between the sixth lens element 160 and the fifth lens element 150, that is, the distance between the eleventh curved surface 161 and the tenth curved surface 152 in the optical axis is preferably 1±5% mm. It can be understood that the sixth lens element 160 may be omitted.

In the embodiment, the first to the fifth lens elements 110, 120, 130, 140, 150 are rotationally symmetrical around the axis of the incident ray, that is, each of the first to the fifth lens elements 110, 120, 130, 140, 150 has a projection in a circular shape on a plane perpendicular to the incident ray 170. In other embodiments, the first to the fifth lens elements 110, 120, 130, 140, 150 may be non-rotationally symmetrical, that is, each of the first to the fifth lens elements 110, 120, 130, 140, 150 has a projection in an elliptical shape, a square shape or any other appropriate shape on a plane perpendicular to the incident ray 170.

In the embodiment, the large filed achromatic lens meets the following requirements: f=20 mm, D/f=0.5, 2H=0.8 mm, $L_K$=15.7 mm, and λ=355 nm-532 nm, wherein f represents a focal length of a lens, D represents a diameter of an entrance pupil, D/f represents a relative aperture, 2H represents a width of a linear field of view, $L_K$ represents a working distance, and λ represents an operating wavelength.

Figure 2A:
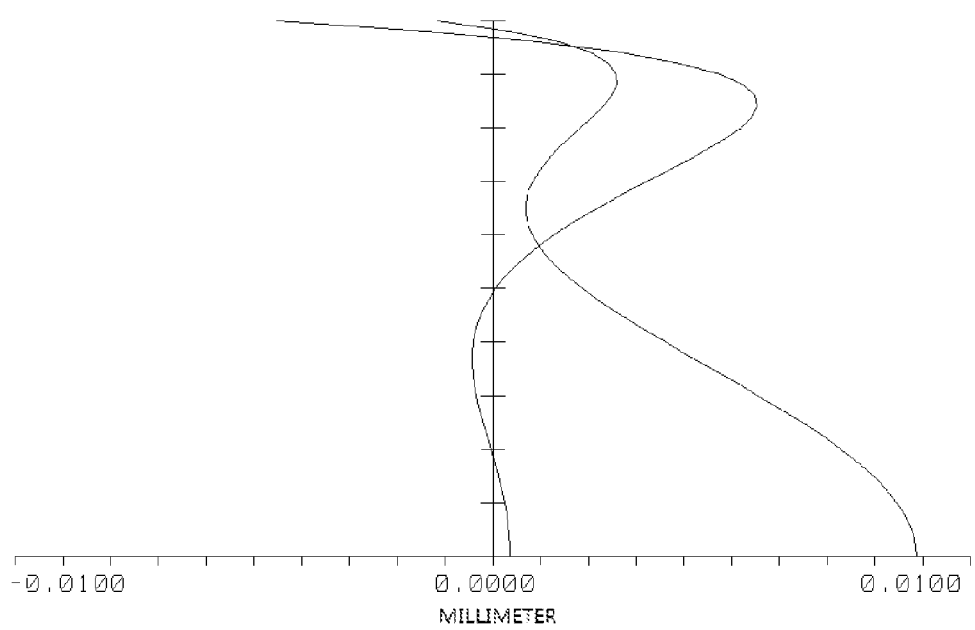
FIG. 2A is a graph illustrating a spherical aberration of the large filed achromatic lens of FIG. 1.
Figure 2B:
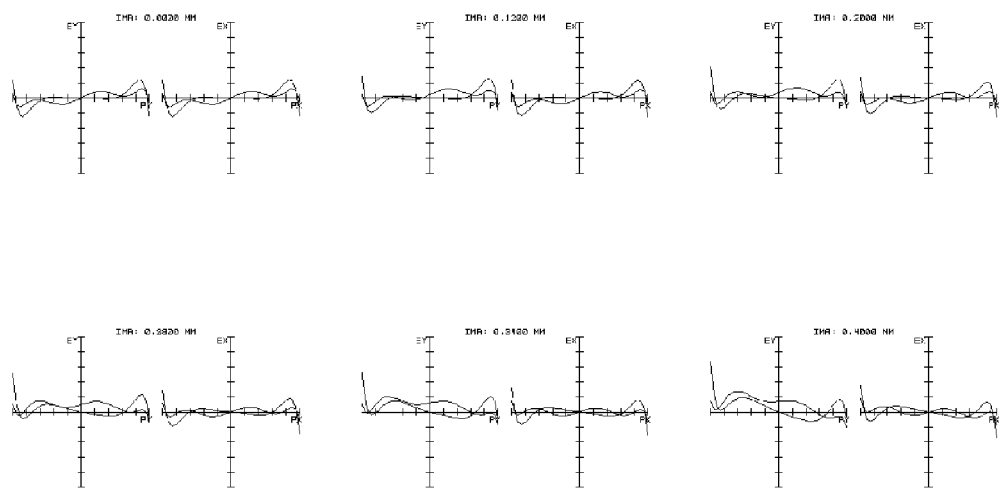
FIG. 2B is a graph illustrating a geometric aberration between the on- and off-axis of the large filed achromatic lens of FIG. 1.
Figure 2C:
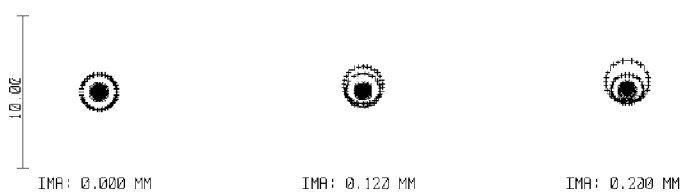
FIG. 2C is a schematic diagram illustrating dispersion of the large filed achromatic lens of FIG. 1.

As shown in FIG. 2A, the spherical aberration curve of the above large filed achromatic lens shows that a satisfactory achromatism is achieved. As shown in FIG. 2B, there is very little geometric aberration between the on- and off-axis of the above large filed achromatic lens, within a range of ±1 μm. As shown in FIG. 2C, the sizes of circles of confusion of the on- and off-axis of the above large filed achromatic lens are relatively uniform. The results of FIGS. 2A, 2B and 2C show the large filed achromatic lens according to the embodiment has a higher achromatism capacity.

Figure 3:
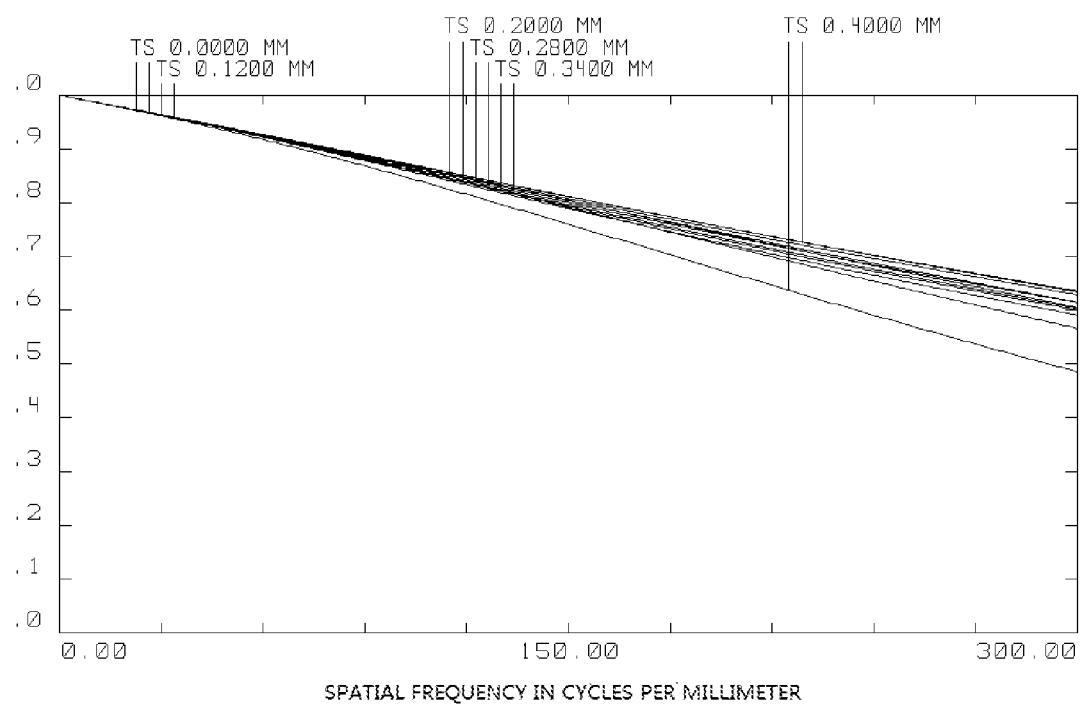
FIG. 3 is graph illustrating a modulation transfer function (MTF) of the large filed achromatic lens of FIG. 1.

The modulation transfer function is an approach to evaluate the imaging quality of a optical system objectively and fully, the ratio between the contrast of the output image and the contrast of the input image is regarded as modulation degree M.F.T, and the modulation transfer function can be represented by a M.F.T curve, with a horizontal axis plotted by resolutions and a vertical axis plotted by contrast. The M.F.T has a value between 0 and 1, wherein, higher values indicate a higher imaging quality of the system, and a clearer image of the system. Please refer to FIG. 3, the graph of the modulation transfer function (MTF) of the above large filed achromatic lens shows that the M.T.F is still 0.6 when the resolution reaches 300 line pairs/mm, meaning that the large filed achromatic lens in the embodiment has a higher optical imaging quality, and is capable of exposing fine lines.

The above large filed achromatic lens can be used as a fine photoetching lens for laser marking, or other fine processing lenses. Due to the lens combination of different types of lens element arranged around a same axis in combination with the optical design, the large filed achromatic lens does not only has a larger field of view, but also ensure the laser ray (with a wave length of about 355 nm) at work focus on a same plane when a visible monitoring ray (with a wave length of about 523 nm) is used preview and focus the surface of the processing work piece. In addition, the large filed achromatic lens has a higher achromatization function and a higher resolution to exposure fine lines to greatly improve the imaging quality. In conclusion, the large filed achromatic lens can achieve the quick alignment and positioning of the laser processing spot on the surface of the processing work piece, to greatly improve the processing efficiency and quality.

The above are preferred embodiments of the present invention described in detail, and should not be deemed as limitations to the scope of the present invention. It should be noted that variations and improvements will become apparent to those skilled in the art to which the present invention pertains without departing from its spirit and scope. Therefore, the scope of the present invention is defined by the appended claims.

What is claimed is:

1. A large field achromatic lens, comprising:
a first lens element, which is a meniscus lens element, including a first curved surface and a second curved surface both protruding outward to an image side;
a second lens element, which is a meniscus lens element, including a third curved surface and a fourth curved surface both protruding outward to an image side;
a third lens element, which is a biconvex lens element, including a fifth curved surface protruding outward to an object side, and a sixth curved surface protruding outward to the image side;
a fourth lens element, which is a biconvex lens element, including a seventh curved surface protruding outward to the object side, and an eighth curved surface protruding outward to the image side;
a fifth lens element, which is a biconcave lens element, including a ninth curved surface protruding outward to the image side, and a tenth curved surface protruding outward to the object side;
wherein the first to the fifth lens elements are arranged sequentially around a same axis along the propagation direction of an incident ray, and the first to the tenth curved surfaces are arranged sequentially along the propagation direction of the incident ray;
wherein center thicknesses of the first to the fifth lens elements are 3 mm, 3 mm, 3 mm, 3 mm and 2 mm respectively, with an allowable tolerance of 10%, an upper variation of tolerance of +5%, and lower variation of tolerance of −5%; and
wherein radiuses of curvature of the first to the tenth curved surfaces are −8 mm, −15 mm, −29 mm, −10 mm, 19 mm, −32 mm, 13 mm, −70 mm, −31 mm and 15 mm respectively, with an allowable tolerance of 10%, an upper variation of tolerance of +5%, and lower variation of tolerance of −5%.

2. The large field achromatic lens of claim 1, wherein center-to-center distances between the second curved surface and the third curved surface, between the fourth curved surface and the fifth curved surface, between the sixth curved surface and the seventh curved surface, and between the eighth curved surface and the ninth curved surface are 0.1 mm, 0.1 mm, 0.1 mm and 1 mm respectively, with an allowable tolerance of 10%, an upper variation of tolerance of +5%, and lower variation of tolerance of −5%.

3. The large field achromatic lens of claim 1, wherein the first to the fifth lens elements are rotationally symmetrical around the axis of the incident ray.

4. The large field achromatic lens of claim 1, wherein each of the first to the tenth curved surfaces is a spherical surface.

5. The large field achromatic lens of claim 1, further comprising a sixth lens element which is a plane lens element arranged on a side of the fifth lens element adjacent to an image, the sixth lens element including an eleventh curved surface and a twelfth curved surface both of which are flat planes.

6. The large field achromatic lens of claim 5, wherein the sixth lens has a thickness of 1 mm, with an allowable tolerance of 10%, an upper variation of tolerance of +5%, and lower variation of tolerance of −5%.

7. The large field achromatic lens of claim 5, wherein the eleventh curved surface is adjacent to the tenth curved surface, and a center-to-center distance between the eleventh curved surface and the tenth curved surface is 1 mm, with an allowable tolerance of 10%, an upper variation of tolerance of +5%, and lower variation of tolerance of −5%.

8. The large field achromatic lens of claim 1, wherein the large field achromatic lens meets the following requirements:

f=20 mm,
D/f=0.5,
2H=0.8 mm,
$L_K$=15.7 mm, and
λ=355 nm-532 nm,
wherein f represents a focal length of a lens, D represents a diameter of an entrance pupil, D/f represents a relative aperture, 2H represents a width of a linear field of view, $L_K$ represents a working distance, and λ represents an operating wavelength.

* * * * *